July 3, 1962     J. R. BRAY     3,042,781
CONTROL CIRCUIT
Filed Aug. 14, 1959
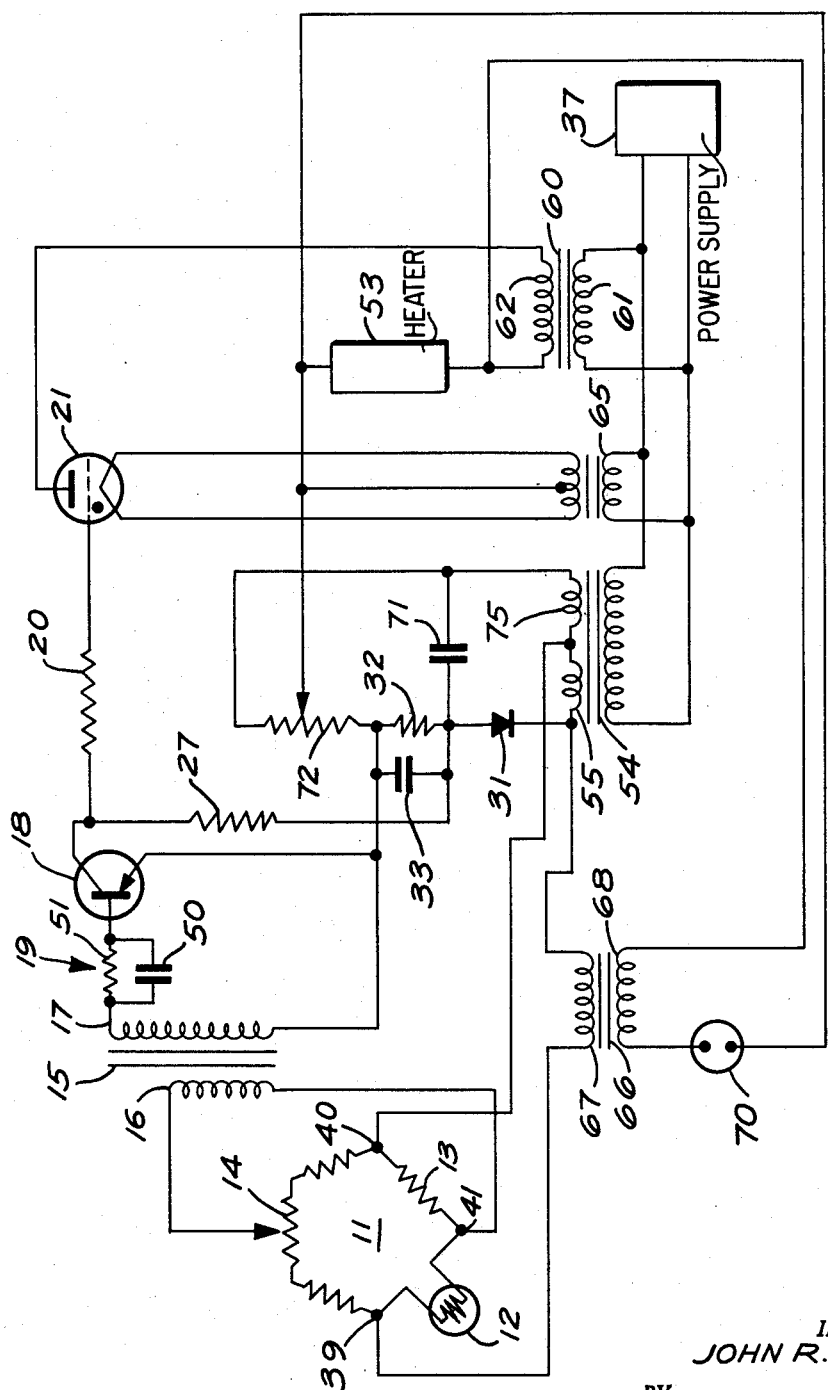
INVENTOR.
JOHN R. BRAY
BY
Robert L. Broad Jr.
ATTORNEY

United States Patent Office 3,042,781
Patented July 3, 1962

3,042,781
CONTROL CIRCUIT
John R. Bray, Pensacola, Fla., assignor, by mesne assignments, to Monsanto Chemical Company, a corporation of Delaware
Filed Aug. 14, 1959, Ser. No. 833,779
7 Claims. (Cl. 219—20)

This invention relates to control circuits and more particularly to circuits for controlling the operation of a heater to maintain a predetermined temperature.

The process of hot drawing of nylon yarn requires an accurate control of the temperature of the yarn. In this process the yarn is drawn over a block which must be maintained at a desired temperature. One of the disadvantages of equipment used in the past for heating the block has been that the temperature of the block could not be maintained within close limits. Thus, one of the objects of this invention is to provide an improved system for maintaining a block within a fraction of a degree of the desired temperature.

Another object of this invention is to provide a novel and improved control circuit.

A further object of this invention is to provide a system having a temperature sensing bridge adapted to control a heater to maintain a predetermined temperature.

A still further object of this invention is to provide a heater control system having a temperature sensing bridge which is operated at one electrical potential when the heater is on and at another potential when the heater is off.

Still another object of this invention is to provide a heater control bridge utilizing a thermistor which is operated at an above-normal electrical potential when the heater is on and at a below-normal potential when the heater is off.

A still further object of this invention is to provide a heater control system wherein a portion of an A.C. voltage operating the heater is fed back through a transformer to modify the operation of a temperature sensing bridge which controls the application of the A.C. voltage to the heater.

According to the system of the present invention, a temperature sensitive element senses the temperature of the block across which the nylon is being drawn. An output signal derived from a bridge in which the temperature sensitive element is connected is amplified and used to control a thyratron tube which passes current to the heater for operating it. A portion of the power applied to the heater is fed back through a transformer to the bridge for modifying its operation to maintain the block temperature at a precise, predetermined value.

The circuit of the invention employs a thermistor to sense the temperature of the block. The thermistor is connected in a bridge circuit across which A.C. power is applied. An A.C. output signal is derived from the bridge and is stepped up by a transformer and applied by a transistor amplifier to the control grid of a thyratron tube. The A.C. voltage which operates the heater is applied across the cathode and plate of the thyratron. The A.C. signals derived from the bridge circuit will have one phase when the temperature is below a selected control point and will have the opposite phase when the temperature is above the control point, the control point being the temperature at which it is desired to maintain the block. When the temperature is at the control point, the signal from the bridge will be null. When the amplified signal applied to the grid of the thyratron is in the proper phase relationship with the A.C. voltage applied to the plate of the thyratron, the thyratron will fire. When the signal applied to the control grid of the thyratron is of the opposite phase from the voltage applied to the plate, the thyratron will not fire.

When the thyratron fires, a voltage from the A.C. power supply is applied to the heater and a portion of this voltage is fed through a transformer back to the bridge circuit. This supplements the voltage ordinarily applied to the bridge circuit to raise the voltage across the circuit sufficiently to effect appreciable self-heating in the thermistor. The heat generated by this self-heating adds to the heat applied to the thermistor by the heater to rapidly decrease the resistance of the thermistor and thereby shut off the heater. When the heater is off, the primary circuit to the feedback transformer is open and the secondary winding of the feedback transformer reflects a greater impedance into the input circuit of the bridge. This drops the voltage across the bridge to a point where the thermistor is subjected to a voltage substantially below its normal operating voltage so that little or no self-heating will occur in the thermistor, there being a normal amount of self-heating in a thermistor operated at the voltage for which it is designed. This causes the bridge to rapidly turn the heater on again. Thus, the heater is rapidly turned on and off, always seeking the predetermined operating temperature level. This results in a highly accurate control of the block temperature, thereby insuring that the drawing operation is carried out with optimum results.

Further objects and advantages of the invention will become apparent as the following detailed description of a preferred embodiment of the invention is read in conjunction with the single figure of the drawing, which single FIGURE shows a schematic layout of the circuit of the present invention.

Referring now in detail to the drawing, a thermistor 12 connected between terminals 39 and 41 forms one leg of a bridge 11. A resistor 13 connected between the terminal 41 and a terminal 40 forms a second leg of the bridge. The third and fourth legs of the bridge are formed by a potentiometer 14, connected between the terminals 39 and 40. The terminals 39 and 40 form two diagonal input points or terminals of the bridge 11, while a movable tap of the potentiometer 14 and the terminal 41 form the other diagonal points, or output points, of the bridge. A power source 37 applies A.C. power to a transformer 54 having a secondary winding 55 connected to the input terminal points 39 and 40 for applying an A.C. voltage across the bridge.

A primary winding 16 of a transformer 15 connected between the terminal 41 and the tap of the potentiometer 14 serves as an output circuit of the bridge 11. At a given setting of the tap of the potentiometer 14, a null signal will be produced in the output circuit of the bridge for a certain temperature of the block (not shown), across which the nylon is drawn. This temperature shall be referred to as the control point or control temperature. The control point or temperature is the temperature at which it is desired to maintain the block. If the temperature rises above this control point, an output signal of one phase will be generated between the terminal 41 and the movable tap of the potentiometer 14 and, if the temperature is below the control point, a signal of the opposite phase will be generated between the terminal 41 and the movable tap. The control point, or operating temperature, can be varied up or down simply by adjusting the movable tap of the potentiometer 14.

The output signal generated between the movable tap of the potentiometer 14 and the terminal 41 is applied to the primary winding 16 of the transformer 15 and is stepped up in a ratio of approximately 14 to 1. The output signal induced in a secondary winding 17 of the transformer 15 is supplied between the base and emitter of the PNP transistor 18. This signal output from the secondary winding 17 is applied through a phase-shifting network 19 connected in series with the base of the transistor 18, the phase-shifting network 19 comprising a capacitor 50 connected in parallel with a resistor 51.

The transistor 18 is connected as an amplifier. A D.C. voltage is applied between the collector and emitter of the transistor 18 from a charged capacitor 33 through a resistor 27. The capacitor 33 is shunted by a resistor 32 and is charged from the secondary winding 55 of the transformer 54 through a rectifier 31. The signal induced in the secondary winding 17 of the transformer 15 will be amplified by the transistor 18. This amplified signal is applied to the control grid of a thyratron 21 through a resistor 20. A transformer 60 having a primary winding 61 connected to the power source 37 is provided with a secondary winding 62 connected in series with an electrically operated heater 53 of a well-known type and the thyratron 21. When the amplified signal applied to the control grid of the thyratron 21 is in phase with the positive plate voltage of the thyratron, current will flow through the winding 62 of the transformer 60, the heater 53 and the thyratron 21, thereby actuating the heater 53 and applying heat to the drawing block. The thyratron 21 will naturally not conduct when its plate voltage is negative, nor will it conduct when the signal applied by the transistor amplifier 18 is negative.

When additional heat is required, the signal applied to the control grid of the thyratron 21 will be positive and in phase with the positive plate voltage of the thyratron, thereby permitting current to flow through the thyratron and the heater 53. When no additional heat is required to maintain the predetermined drawing temperature, the signal applied to the control grid of the thyratron 21 will be negative, thereby preventing conduction of the tube 21 and actuation of the heater 53. A transformer 65 connected to the power source 37 supplies a cathode heater voltage to the thyratron 21.

A feedback transformer 66 having a secondary winding 67 connected in the input circuit of the bridge 11 is provided with a primary winding 68 connected across the heater 53. A neon tube 70 is connected in series with the primary winding 68 of the transformer 66 to prevent flow of current through this winding 68 when the heater 53 is not in operation. The neon tube 70 also serves to indicate that the heater 53 is on. A secondary winding 75 and the winding 55 of the transformer 54 are connected together to charge a capacitor 71 and maintain a predetermined voltage on the cathode of the thyratron 21 through a potentiometer 72.

In operating the control system of the present invention, A.C. voltage is applied to the bridge 11 through the secondary winding 55 of the transformer 54. When the temperature of the block falls below the desired operating value, the bridge 11 generates an output signal substantially in phase with the thyratron plate voltage. This signal is phase-shifted into precise alignment with the thyratron plate voltage by the network 19, amplified by the transistor 18 and applied to the control grid of the thyratron 21. This causes the thyratron 21 to conduct. Conduction of the thyratron 21 permits current to flow through the circuit including the secondary winding 62 of the transformer 60, the heater 53 and the thyratron 21. Current flow in the heater 53 applies heat to the block to raise its temperature.

The voltage across the heater 53 when it is on will be reflected through the transformer 66 into the input circuit of the bridge 11. The voltage across the heater 53 is sufficient to ionize the neon tube 70, whereupon A.C. current flows in the primary winding 68 and induces a voltage in the secondary winding 67. This voltage adds to the voltage induced in the secondary winding 55 of the transformer 54 to increase the voltage applied between input terminals 39 and 40 of the bridge 11. The circuit components are such that the increased voltage applied to the thermistor when the heater 53 is on will cause appreciable self-heating in the thermistor. The heat applied to the thermistor by the heater adds to the heat generated in the thermistor by the current resulting from the increased voltage to vary the temperature of the thermistor at a faster-than-normal rate. This causes the heater to be turned off sooner than otherwise, thereby increasing the cycling rate of the heater for maintaining more accurate temperature control.

When the heater 53 is not on, there is no voltage across the heater 53 and the neon tube 70 is extinguished to prevent stray current flow in the primary winding 68 of the feedback transformer 66 and to indicate that the heater 53 is off. Since no current can flow in the primary winding 68, the secondary winding 67 of the transformer 66 acts as an impedance in the input circuit of the bridge 11, thereby substantially lowering the voltage applied to the input terminals 39 and 40. At this substantially lowered voltage, the voltage applied to the thermistor 12 is substantially below the normal design voltage of the thermistor. When a thermistor is operated at its normal or design voltage, there occurs in the thermistor a certain amount of self-heating, since power is expended in the thermistor. However, at a substantially lower voltage, little or no self-heating will occur in the thermistor. This is the case when the heater 53 is off and the winding 67 is acting as an impedance in the bridge input circuit. This below normal amount of self-heating causes the resistance of the thermistor 12 to rise more rapidly than would be the case if normal self-heating were present. This, in turn, causes the heater 53 to be turned on after a shorter time interval than would be the case if normal self-heating were present. Thus, the off period of the heater 53 is shorter than normal, thereby speeding the cycling rate of the heater 53 to provide a more uniform heat input to the block across which the nylon yarn is being drawn.

In summary, when the heater 53 is on, the feedback transformer 66 connected across the heater increases the voltage applied to the thermistor 12 to an above-normal value. This causes appreciable self-heating in the thermistor, thereby rapidly decreasing its resistance to shorten the on period of the heater. When the heater 53 is off, the secondary winding 67 acts as an impedance in the bridge input circuit, thereby lowering the voltage applied to the thermistor 12 to a below-normal value. Under this lowered voltage, little or no self-heating will occur in the thermistor 12. The resistance of the thermistor will then rapidly increase to shorten the off period of the heater 53. Since both on and off periods are shortened, the cycling rate of the heater 53 is increased to provide a more uniform heat input to the block. This results in a very accurate control of the temperature of the block.

It is to be understood that the above-described embodiment of the present invention may be modified and many other embodiments may be contemplated without departing from the spirit and scope of the invention.

What is claimed is:

1. A heater control circuit, comprising a bridge having therein a resistance variable in response to temperature, means for applying an input voltage to the bridge, means connected to the bridge for producing a signal of one phase when the bridge is unbalanced in one direction and a signal of the opposite phase when the bridge is unbalanced in the other direction, a heater, means operable in response to said signal of said one phase for actuating the heater, and a feedback network connected in series with the heater and the input voltage applying means and operated by said heater actuating means for increasing the bridge input voltage when said bridge is unbalanced in said one direction and for decreasing said input voltage when the bridge is unbalanced in said other direction so as to vary the heat generated in the resistance by current flow therethrough.

2. A temperature control circuit, comprising a temperature sensing bridge having therein a resistance variable in response to temperature, said bridge being adapted to sense the temperature at a predetermined location, means for varying the temperature at said predetermined location, a power supply connected to the bridge for applying an input voltage thereto, means connected to the bridge for actuating the temperature varying means to increase the temperature at said location when the bridge is unbalanced in one direction and for decreasing said temperature when the bridge is unbalanced in the other direction, and a feedback network connected in series with the bridge and the power supply and operated by said actuating means for increasing the bridge input voltage when said bridge is unbalanced in said one direction and for decreasing the bridge input voltage when said bridge is unbalanced in said other direction so as to expend power in the resistance at an above normal rate when the bridge is unbalanced in said one direction and at a below normal rate when the bridge is unbalanced in said other direction.

3. A heater control circuit, comprising a bridge having therein a resistance variable in response to temperature, means for applying an input voltage to the bridge, a heater, means operable in response to a signal from the bridge for actuating the heater when the bridge is unbalanced in one direction and for preventing operation of the heater when the bridge is unbalanced in the other direction, and a fedback network connected in series with the heater and the input voltage applying means and operated by the actuating means for varying the input voltage applied to the bridge to continuously drive the bridge toward a balanced condition by varying the power expended in said resistance.

4. A heater control circuit, comprising a temperature sensing bridge having therein a resistance variable in response to temperature, a power supply connected to the bridge for applying an input voltage thereto, a heater, means responsive to an unbalanced condition in the bridge for actuating the heater, and a transformer having a secondary winding connected in series with the power supply and the bridge and a primary winding connected to the heater in such a manner that power is applied to the primary winding of the transformer when the heater is actuated.

5. A heater control circuit, comprising a temperature sensing bridge having therein a thermistor designed for operation at a predetermined voltage, a power supply connected to the bridge, an electrically operated heater, means connected to the bridge for connecting the power supply to the heater when the bridge is unbalanced in one direction, and a transformer having a secondary winding connected in series with the power supply and the bridge having a secondary winding connected across the heater so that a voltage is induced in said secondary winding when the heater is actuated, said induced voltage supplementing the power supply voltage to operate the thermistor at a voltage greater than said predetermined voltage and said secondary winding acting as an impedance when the power supply is disconnected from the heater so as to operate the thermistor at a voltage greater than said predetermined voltage.

6. A heater control circuit comprising a temperature sensing bridge having a thermistor, an output transformer connected to the output points of the bridge, a power supply connected to input points of the bridge, a transistor amplifier connected to the output transformer for amplifying signals received from the bridge, said signals being of one phase when the bridge is unbalanced in one direction and of the opposite phase when the bridge is unbalanced in the other direction, a thyratron connected to the transistor for conduction in response to said signals of said one phase, a heater connected in series with the thyratron and the power supply for generating heat when the thyratron conducts, and a feedback transformer having a primary winding connected in parallel with the heater and a secondary winding connected in series with the power supply and the input points of the bridge in such a manner that upon conduction of the thyratron a voltage is induced in said secondary winding to supplement the power supply voltage to increase the bridge input voltage to an above normal value and upon nonconduction of the thyratron said secondary winding acts as an impedance to decrease the bridge input voltage to a below normal value.

7. A heater control circuit, comprising a temperature sensing bridge having a thermistor therein, a power supply connected across the bridge for applying an input voltage thereto, an amplifier, a transformer connected to the amplifier and across the bridge for applying a signal of one phase to the amplifier when the bridge is unbalanced in one direction and a signal of the opposite phase when the bridge is unbalanced in the other direction, a heater, a thyratron connected to the amplifier and the power supply for applying power to the heater in response to a control signal from the amplifier, a phase shifting network connected to the input of the amplifier for adjusting the phase of the control signal relative to the phase of the power applied to the thyratron, and a feedback transformer having a primary winding connected in parallel with the heater and a secondary winding connected in series with the power supply and the bridge.

References Cited in the file of this patent
UNITED STATES PATENTS

| | | |
|---|---|---|
| 2,616,020 | Fay et al. | Oct. 28, 1952 |
| 2,651,704 | Prior | Sept. 8, 1953 |
| 2,761,052 | Knudsen | Aug. 28, 1956 |
| 2,825,789 | Scott | Mar. 4, 1958 |
| 2,838,644 | Rolfson et al. | June 10, 1958 |
| 2,892,916 | Holmes | June 30, 1959 |
| 2,958,008 | Bray et al. | Oct. 25, 1960 |

OTHER REFERENCES

Wilson: Electronics, December 1950 (pp. 84–87).

UNITED STATES PATENT OFFICE
CERTIFICATE OF CORRECTION

Patent No. 3,042,781                                July 3, 1962

John R. Bray

It is hereby certified that error appears in the above numbered patent requiring correction and that the said Letters Patent should read as corrected below.

Column 6, line 2, for "greater" read -- lower --.

Signed and sealed this 5th day of February 1963.

(SEAL)
Attest:

ERNEST W. SWIDER
Attesting Officer

DAVID L. LADD
Commissioner of Patents